(12) United States Patent
Lee et al.

(10) Patent No.: US 10,707,527 B2
(45) Date of Patent: Jul. 7, 2020

(54) GEL POLYMER ELECTROLYTE, ELECTROCHEMICAL DEVICE, AND METHODS THEREOF

(71) Applicant: JENAX INC., Busan (KR)

(72) Inventors: Sang Young Lee, Ulsan (KR); Se Hee Kim, Gangwon-do (KR); Sung Ju Cho, Ulsan (KR)

(73) Assignee: JENAX INC., Busan (KR)

( * ) Notice: Subject to any disclaimer, the term of this patent is extended or adjusted under 35 U.S.C. 154(b) by 144 days.

(21) Appl. No.: 15/548,164

(22) PCT Filed: Dec. 14, 2015

(86) PCT No.: PCT/KR2015/013675
§ 371 (c)(1),
(2) Date: Aug. 2, 2017

(87) PCT Pub. No.: WO2016/133279
PCT Pub. Date: Aug. 25, 2016

(65) Prior Publication Data
US 2018/0034101 A1    Feb. 1, 2018

(30) Foreign Application Priority Data
Feb. 17, 2015 (KR) .................. 10-2015-0024262

(51) Int. Cl.
| | | |
|---|---|---|
| *H01M 6/14* | (2006.01) | |
| *H01M 10/0565* | (2010.01) | |
| *H01G 11/56* | (2013.01) | |
| *H01M 10/052* | (2010.01) | |
| *H01M 10/0569* | (2010.01) | |
| *H01G 11/22* | (2013.01) | |
| *H01G 11/52* | (2013.01) | |
| *H01M 10/0568* | (2010.01) | |

(52) U.S. Cl.
CPC ........ *H01M 10/0565* (2013.01); *H01G 11/22* (2013.01); *H01G 11/52* (2013.01); *H01G 11/56* (2013.01); *H01M 10/052* (2013.01); *H01M 10/0568* (2013.01); *H01M 10/0569* (2013.01); *H01M 2300/0028* (2013.01); *H01M 2300/0085* (2013.01); *Y02E 60/13* (2013.01)

(58) Field of Classification Search
CPC ........ H01M 10/0565; H01M 10/0568; H01M 10/0569; H01M 10/052; H01M 10/0525; H01M 2300/0028; H01M 2300/0085; H01G 11/22; H01G 11/52; H01G 11/56; Y02E 60/13
See application file for complete search history.

(56) References Cited

U.S. PATENT DOCUMENTS

| | | | |
|---|---|---|---|
| 6,756,153 B1 | 6/2004 | Yamamoto et al. | |
| 2002/0110739 A1* | 8/2002 | McEwen | H01G 9/022 429/324 |
| 2006/0204854 A1* | 9/2006 | Fujimoto | C08J 5/20 429/303 |
| 2010/0047690 A1 | 2/2010 | Tsuchiya et al. | |
| 2011/0256456 A1* | 10/2011 | Jeon | H01M 10/0565 429/303 |
| 2014/0220452 A1* | 8/2014 | Yu | H01M 10/0565 429/303 |

FOREIGN PATENT DOCUMENTS

| | | |
|---|---|---|
| CN | 101563808 A | 10/2009 |
| CN | 101814628 A | 8/2010 |
| EP | 1098382 A2 | 5/2001 |
| EP | 1363346 A1 | 11/2003 |
| JP | 2003-068137 A | 3/2003 |
| JP | 2004-059865 A | 2/2004 |
| JP | 2007/048761 A | 2/2007 |
| KR | 10-2008-0058197 A | 6/2008 |
| KR | 10-2011-0136740 A | 12/2011 |
| KR | 10-2013-0008830 A | 1/2013 |
| KR | 10-2014-0145450 A | 12/2014 |
| WO | 2012-099321 A | 7/2010 |
| WO | 2012-039500 A1 | 3/2012 |

OTHER PUBLICATIONS

International search report and written opinion for PCT/KR2015/013675 dated Apr. 1, 2016.
European search report and written opinion for PCT/KR2015/013675 dated Jun. 25, 2018.
JP Office Action, JP Application No. 2017-542478 dated Aug. 31, 2018.
Chinese Office Action, CN Application No. 201580074047.5 dated Dec. 24, 2018.

* cited by examiner

*Primary Examiner* — Raymond Alejandro
(74) *Attorney, Agent, or Firm* — The Dobrusin Law Firm, P.C.

(57) ABSTRACT

The teachings herein relate to a gel polymer electrolyte, manufacturing of a gel polymer electrolyte, and an electrochemical device including the gel polymer electrolyte. The present gel polymer electrolyte preferably includes a multi-component crosslinked polymer matrix; a dissociable salt; and an organic solvent. The content of the multi-component crosslinked polymer matrix preferably is 1 to 50 weight percent and preferably has a net structure formed by cross-linking at least three different kinds of cross-linkable monomers. Each of the cross-linkable monomers preferably includes at least two of the following functional groups: a carboxylic group, an acrylate group, or a cyano group. The method of manufacturing the gel polymer electrolyte preferably uses a thermal crosslinking or photo-crosslinking process.

20 Claims, 15 Drawing Sheets

GEL POLYMER ELECTROLYTE, ELECTROCHEMICAL DEVICE, AND METHODS THEREOF

TECHNICAL FIELD

The present invention relates to a gel polymer electrolyte, a method of manufacturing the same, and an electrochemical device including the same.

BACKGROUND ART

Recently, an energy storage and conversion technology has been recognized as important, an interest in various kinds of electrochemical devices has increased.

Among them, a lithium rechargeable battery capable of being charged and discharged has been remarkably spotlighted, and in general, the lithium rechargeable battery is composed of a cathode, an anode, a separator, and an electrolyte, wherein as the electrolyte, a liquid electrolyte is generally used.

However, in the case of the lithium rechargeable battery using the liquid electrolyte, since the liquid electrolyte may be leaked, and growth of lithium dendrite is accompanied during a charge process, there is a potential risk of explosion, or the like.

In order to solve this problem, an attempt to develop a lithium rechargeable battery using a solid electrolyte instead of the liquid electrolyte has been continuously conducted. However, since in the case of the solid electrolyte, adhesion with an electrode (in detail, an active material) is low as compared to the liquid electrolyte, the solid electrolyte has a limitation in that an interface between the electrolyte and the electrode is unstable.

DISCLOSURE

Technical Problem

The present inventors developed a gel type polymer electrolyte in order to overcome the above-mentioned limitation. A detailed description thereof is as follows.

Technical Solution

An exemplary embodiment of the present invention provides a gel polymer electrolyte including a multi-component crosslinked polymer matrix; a dissociable salt; and an organic solvent, wherein a content of the multi-component crosslinked polymer matrix is 1 to 50 wt % and the multi-component crosslinked polymer matrix has a net structure formed by crosslinking at least three different kinds of crosslinkable monomers, each of the crosslinkable monomers including at least two functional groups selected from the group consisting of a carboxylic group, an acrylate group, and a cyano group.

Another embodiment of the present invention provides a method of manufacturing a gel polymer electrolyte including mixing at least three different kinds of crosslinkable monomers, a dissociable salt, and an organic solvent and applying heat or ultraviolet (UV) light to crosslink at least three different kinds of crosslinkable monomers.

Yet another embodiment of the present invention provides an electrochemical device including the gel polymer electrolyte as described above.

According to the exemplary embodiment of the present invention, there is provided the gel polymer electrolyte including the multi-component crosslinked polymer matrix; the dissociable salt; and the organic solvent, wherein the content of the multi-component crosslinked polymer matrix is 1 to 50 wt % and the multi-component crosslinked polymer matrix has the net structure formed by crosslinking at least three different kinds of crosslinkable monomers, each of the crosslinkable monomers including at least two functional groups selected from the group consisting of the carboxylic group, the acrylate group, and the cyano group.

Each of the crosslinkable monomers may be any one selected from the group consisting of a thermally crosslinkable monomer, a derivative of the thermally crosslinkable monomer, a photo-crosslinkable monomer, a derivative of the photo-crosslinkable monomer, and a combination thereof.

In detail, the crosslinkable monomer may be any one selected from the group consisting of trimethylolpropane-ethoxylate triacrylate, acrylic acid, carboxyethyl acrylate, poly acrylic acid, carboxymethyl cellulose, alginate, polyvinyl alcohol, agarose, polyethylene glycol diacrylate, triethylene glycol diacrylate, bisphenol-A-ethoxylate dimethacrylate, carboxyethyl acrylate, methyl cyanoacrylate, ethyl cyanoacrylate, ethyl cyano ethoxyacrylate, cyano acrylic acid, hydroxyethyl methacrylate, hydroxypropyl acrylate, derivatives thereof, and mixtures thereof.

The dissociable salt may include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (here, x and y are natural numbers), LiCl, LiI, $LiB(C_2O_4)_2$ (lithium bis(oxalato) borate; LiBOB), or a combination thereof.

A concentration of the dissociable salt in the organic solvent may be 0.1 to 5.0M.

The organic solvent may include a carbonate based solvent, an ester based solvent, an ether based solvent, a ketone based solvent, an alcohol based solvent, an aprotic solvent, a nitrile based solvent, a glyme based solvent, or a combination thereof.

According to another exemplary embodiment of the present invention, there is provided a method of manufacturing a gel polymer electrolyte including: mixing at least three different kinds of crosslinkable monomers, a dissociable salt, and an organic solvent to prepare a precursor composition; and applying heat or UV light to the precursor composition to crosslink at least three different kinds of crosslinkable monomers, wherein when at least three different kinds of crosslinkable monomers are crosslinked, a multi-component crosslinked polymer matrix having a net structure is formed.

Each of the crosslinkable monomers may include at least two functional groups selected from the group consisting of a carboxylic group, an acrylate group, and a cyano group.

In detail, each of the crosslinkable monomers may be any one selected from the group consisting of a thermally crosslinkable monomer, a derivative of the thermally crosslinkable monomer, a photo-crosslinkable monomer, a derivative of the photo-crosslinkable monomer, and a combination thereof.

In more detail, each of the crosslinkable monomer may be any one selected from the group consisting of trimethylolpropane-ethoxylate triacrylate, acrylic acid, carboxyethyl acrylate, poly acrylic acid, carboxymethyl cellulose, alginate, polyvinyl alcohol, agarose, polyethylene glycol diacrylate, triethylene glycol diacrylate, bisphenol-A-ethoxylate dimethacrylate, carboxyethyl acrylate, methyl cyanoacrylate, ethyl cyanoacrylate, ethyl cyano ethoxyacrylate, cyano acrylic acid, hydroxyethyl methacrylate, hydroxypropyl acrylate, derivatives thereof, and mixtures thereof.

In the mixing of at least three different kinds of crosslinkable monomers, the dissociable salt, and the organic solvent to prepare the precursor composition, a total content of the crosslinkable monomers in the prepared precursor composition may be 1 to 50 wt %.

Meanwhile, a concentration of the dissociable salt in the organic solvent may be 0.1 to 5.0 M.

Advantageous Effects

According to another exemplary embodiment of the present invention, there is provided an electrochemical device including: a cathode; an anode; a separator; and an electrolyte impregnated into the cathode, the anode, and the separator, wherein the electrolyte is the gel polymer electrolyte according to any one of the exemplary embodiments described above.

In detail, the electrochemical device may be a lithium rechargeable battery or a super capacitor.

According to an embodiment of the present invention, a gel polymer electrolyte capable of having excellent adhesion with an electrode to form a stable electrolyte-electrode interface, and having excellent mechanical properties and electrochemical properties may be provided.

According to another exemplary embodiment of the present invention, a method of manufacturing a gel polymer electrolyte having the above-mentioned properties using a simple thermally crosslinking or photo-crosslinking process may be provided.

According to another exemplary embodiment of the present invention, an electrochemical device capable of having excellent capacity and cycle life characteristics by including the gel polymer electrolyte as described above may be provided.

MODE FOR INVENTION

Figure 1:
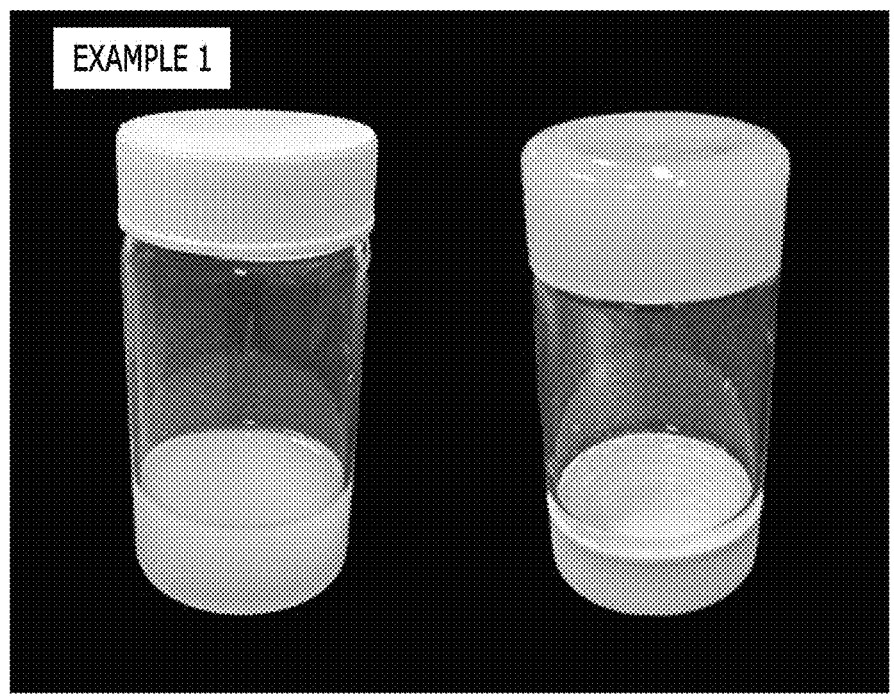
FIG. 1 is a photograph illustrating an exterior of a gel polymer electrolyte according to an exemplary embodiment of the present invention.

Hereinafter, exemplary embodiments of the present invention will be described in detail. However, the exemplary embodiments are described for illustrative purpose, but the present invention is not limited thereto. Therefore, the present invention will be defined by the scope of the appended claims to be described below.

According to an exemplary embodiment of the present invention, there is provided a gel polymer electrolyte including a multi-component crosslinked polymer matrix; a dissociable salt; and an organic solvent, wherein a content of the multi-component crosslinked polymer matrix is 1 to 50 wt %, and the multi-component crosslinked polymer matrix has a net structure formed by crosslinking at least three different kinds of crosslinkable monomers, each of the crosslinkable monomers including at least two functional groups selected from the group consisting of a carboxylic group, an acrylate group, and a cyano group.

The gel polymer electrolyte may be a gel polymer electrolyte capable of having excellent adhesion with an electrode due to the multi-component crosslinked polymer matrix to contribute to stabilization of an electrolyte-electrode interface, and having excellent mechanical properties and electrochemical properties.

In detail, the dissociable salt and the organic solvent may infiltrate into the multi-component crosslinked polymer matrix, such that the multi-component crosslinked polymer matrix may be swelled, thereby making it possible to form a gel type polymer electrolyte. This gel type polymer electrolyte may have excellent adhesion with the electrode.

In addition, since the multi-component crosslinked polymer matrix is a kind of crosslinked polymer, the multi-component crosslinked polymer matrix may have excellent mechanical properties. At the time of applying the multi-component crosslinked polymer matrix to a flexible battery, it is possible to implement stable battery performance in spite of shape deformation by various external forces, and suppress risks of battery ignition, explosion, or the like, which may be caused by shape deformation of the battery.

In more detail, the multi-component crosslinked polymer matrix, which is a polymer formed by crosslinking at least three different kinds of monomers, has a net structure in which specific functional groups included in the crosslinkable monomers are crosslinked.

Here, the specific functional groups mean at least two functional groups selected from the group consisting of the carboxylic group, the acrylate group, the cyano group described above.

Since the carboxyl group and the cyano group may impart excellent adhesion to the gel polymer electrolyte and the acrylate group may improve mechanical properties of the gel polymer electrolyte, the gel polymer electrolyte including these functional groups to thereby be crosslinked may contribute to improving capacity and cycle life characteristics of an electrochemical device. This fact is supported by Examples and Experimental Examples to be described below.

Hereinafter, the gel polymer electrolyte according to the exemplary embodiment of the present invention will be described in detail.

A description of the multi-component crosslinked polymer matrix is as follows.

Meanwhile, a content of the multi-component crosslinked polymer matrix in a total weight (100 wt %) of the gel polymer electrolyte may be 1 to 50 wt %.

In the case in which the content of the multi-component crosslinked polymer matrix satisfies this range, the above-mentioned characteristics, that is, excellent adhesion with the electrode, stabilization of the electrolyte-electrode interface due to the excellent adhesion, excellent mechanical properties and electrochemical properties, and the like, may be exhibited.

However, when the content of the multi-component crosslinked polymer matrix in the gel polymer electrolyte is more than 50 wt %, contents of the organic solvent and the dissociable salt are relatively decreased, respectively. That is, since the content of the multi-component crosslinked polymer matrix, which is non-ion conductive is increased, and the contents of the organic solvent and the dissociable salt, which are ion-conductive, are decreased, ion conductivity of the gel polymer electrolyte may be decreased.

On the contrary, when the content of the multi-component crosslinked polymer matrix in the gel polymer electrolyte is less than 1 wt %, the contents of the organic solvent and the dissociable salt are relatively increased, respectively. That is, since the content of the multi-component crosslinked polymer matrix exhibiting mechanical strength is decreased, and the contents of the organic solvent and the dissociable salt that may not impart mechanical strength are increased, respectively, it may be difficult to secure mechanical strength of the gel polymer electrolyte.

More specifically, the content of the multi-component crosslinked polymer matrix may be 1 to 20 wt %. In this case, the above-mentioned characteristics may be more excellently exhibited, and this fact is supported by Examples and Experimental Examples to be described below.

As described above, the multi-component crosslinked polymer matrix is formed by crosslinking at least three different kinds of crosslinkable monomers. A description of the crosslinkable monomers is as follows.

Each of the crosslinkable monomers may be any one selected from the group consisting of a thermally crosslinkable monomer, a derivative of the thermally crosslinkable monomer, a photo-crosslinkable monomer, a derivative of the photo-crosslinkable monomer, and a combination thereof.

In detail, each of the crosslinkable monomers may be any one selected from the group consisting of trimethylolpropane-ethoxylate triacrylate, acrylic acid, carboxyethyl acrylate, poly acrylic acid, carboxymethyl cellulose, alginate, polyvinyl alcohol, agarose, polyethylene glycol diacrylate, triethylene glycol diacrylate, bisphenol-A-ethoxylate dimethacrylate, carboxyethyl acrylate, methyl cyanoacrylate, ethyl cyanoacrylate, ethyl cyano ethoxyacrylate, cyano acrylic acid, hydroxyethyl methacrylate, hydroxypropyl acrylate, derivatives thereof, and mixtures thereof.

The dissociable salt may be a lithium salt. In this case, the lithium salt is dissociated in the organic solvent, thereby serving as a lithium ion source in an electrochemical device and serving to promote movement of lithium ions between a cathode and an anode.

In the case in which the dissociable salt is the lithium salt, an example of the lithium salt may include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (here, x and y are natural numbers), LiCl, LiI, $LiB(C_2O_4)_2$ (lithium bis(oxalato) borate; LiBOB), or a combination thereof.

A concentration of the dissociable salt in the organic solvent may be 0.1 to 5.0 M. In this case, the gel polymer electrolyte may have a suitable viscosity in a gel form, and the dissociable salt is dissolved in the organic solvent to contribute to effective movement of the lithium ions.

However, in the case in which the concentration of the dissociable salt is excessively high (more than 5.0 M), it may be difficult to dissolve and dissociate the dissociable salt in the organic solvent, and thus, ion conductivity of the gel polymer electrolyte may be decreased.

On the contrary, in the case in which the dissociable salt is dissolved and dissociated in the organic solvent at a low concentration lower than 0.1 M, as the content of the dissociable salt, which is ion conductive, is decreased, ion conductivity of the gel polymer electrolyte may be decreased.

The organic solvent may include a carbonate based solvent, an ester based solvent, an ether based solvent, a ketone based solvent, an alcohol based solvent, an aprotic solvent, a nitrile based solvent, a glyme based solvent, or a combination thereof.

As the carbonate based solvent, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like, may be used.

As the ester based solvent, methyl acetate, ethyl acetate, n-propyl acetate, 1,1-dimethylethyl acetate, methylpropinonate, ethylpropinonate, γ-butyrolactone, decanolide, valerolactone, mevalonolactone, caprolactone, or the like, may be used.

As the ether based solvent, dibutyl ether, tetraglyme, diglyme, dimethoxyethane, 2-methyltetrahydrofuran, tetrahydrofuran, or the like, may be used, and as the ketone based solvent, cyclohexanone, or the like, may be used.

As the alcohol based solvent, ethyl alcohol, isopropyl alcohol, or the like, may be used, and as the aprotic solvent, nitriles such as R-CN (R is a straight or branched (C2-C20) hydrocarbon group or a cyclic hydrocarbon group, and may include a double bond aromatic ring or an ether bond), or the like, amides such as dimethylformamide, or the like, dioxolanes such as 1,3-dioxolane, or the like, sulfolanes, or the like, may be used.

As the nitrile based solvent, succinonitrile, adiponitrile, sebaconitrile, acetonitrile, propionitrile, or the like, may be used.

Specifically, the organic solvent may be a cyclic carbonate based solvent such as ethylene carbonate, propylene carbonate, g-butylrolactone, or the like. Further, the organic solvent may be a glyme solvent such as ethylene glycol dimethyl ether, or the like.

The organic solvent may be used alone, or a mixture of one or more of these organic solvents may be used. In the case of using the mixture of one or more thereof, a mixing ratio may be suitably adjusted depending on the desired battery performance, which may be widely understood by those skilled in the art.

According to another exemplary embodiment of the present invention, there is provided a method of manufacturing a gel polymer electrolyte including: mixing at least three different kinds of crosslinkable monomers, a dissociable salt, and an organic solvent to prepare a precursor composition; and applying heat or UV light to the precursor composition to crosslink at least three different kinds of crosslinkable monomers, wherein when at least three different kinds of crosslinkable monomers are crosslinked, a multi-component crosslinked polymer matrix having a net structure is formed.

This method corresponds to a method of manufacturing a gel polymer electrolyte having the above-mentioned characteristics by a simple thermally crosslinking or photo-crosslinking process.

A description of the crosslinkable monomer is as follows, and since the crosslinkable monomer is the same as described above, a detailed description thereof will be omitted.

Each of the crosslinkable monomers may include at least two functional groups selected from the group consisting of a carboxylic group, an acrylate group, and a cyano group.

In detail, each of the crosslinkable monomers may be any one selected from the group consisting of a thermally crosslinkable monomer, a derivative of the thermally crosslinkable monomer, a photo-crosslinkable monomer, a derivative of the photo-crosslinkable monomer, and a combination thereof.

In more detail, each of the crosslinkable monomers may be any one selected from the group consisting of trimethylolpropane-ethoxylate triacrylate, acrylic acid, carboxyethyl acrylate, poly acrylic acid, carboxymethyl cellulose, alginate, polyvinyl alcohol, agarose, polyethylene glycol diacrylate, triethylene glycol diacrylate, bisphenol-A-ethoxylate dimethacrylate, carboxyethyl acrylate, methyl cyanoacrylate, ethyl cyanoacrylate, ethyl cyano ethoxyacrylate, cyano acrylic acid, hydroxyethyl methacrylate, hydroxypropyl acrylate, derivatives thereof, and mixtures thereof.

In the mixing of at least three different kinds of crosslinkable monomers, the dissociable salt, and the organic solvent to prepare the precursor composition, a total content of the crosslinkable monomers in the prepared precursor composition may be 1 to 50 wt %. Meanwhile, a concentration of the dissociable salt in the organic solvent may be 0.1 to 5.0 M.

A reason for limiting component contents of the precursor composition is the same as a reason for limiting component contents of the multi-component crosslinked polymer matrix.

Each of the crosslinkable monomers may be any one selected from the group consisting of the thermally crosslinkable monomer, the derivative of the thermally crosslinkable monomer, and the combination thereof.

In this case, the applying of the heat or UV light to the precursor composition to crosslink at least three different kinds of crosslinkable monomers may be performed by applying heat to the precursor composition.

Therefore, at least three different kinds of crosslinkable monomers contained in the precursor composition are thermally crosslinked, and the dissociable salt and the organic solvent infiltrate into the multi-component crosslinked polymer matrix having the net structure formed as a result of the crosslinking, such that the gel type polymer electrolyte may be finally formed.

Meanwhile, each of the crosslinkable monomers may be any one selected from the group consisting of the photo-crosslinkable monomer, the derivative of the photo-crosslinkable monomer, and a combination thereof.

In this case, the applying of the heat or UV light to the precursor composition to crosslink at least three different kinds of crosslinkable monomers may be performed by applying UV light to the precursor composition.

Therefore, at least three different kinds of crosslinkable monomers contained in the precursor composition are photo-crosslinked, and the dissociable salt and the organic solvent infiltrate into the multi-component crosslinked polymer matrix having the net structure formed as a result of the crosslinking, such that the gel type polymer electrolyte may be finally formed.

According to another exemplary embodiment of the present invention, there is provided an electrochemical device including: a cathode; an anode; a separator; and an electrolyte impregnated into the cathode, the anode, and the separator, wherein the electrolyte is a gel polymer electrolyte according to any one of the exemplary embodiments described above.

In detail, the electrochemical device may be a lithium rechargeable battery or a super capacitor.

Since a description of characteristics of the gel polymer electrolyte, and excellent performance of the electrochemical device using the same is the same as described above, the description thereof will be omitted.

Hereinafter, electrodes (that is, the cathode and the anode) included in the electrochemical device will be described in detail.

Each of the electrodes includes a current collector and an active material layer formed on the current collector.

The cathode may include a cathode current collector and a cathode active material layer formed on the cathode current collector, and the cathode active material layer may contain a cathode active material, a conductive material, and a binder.

As the cathode current collector, an aluminum thin film may be used, but the cathode current collector is not limited thereto.

The cathode active material is not particularly limited as long as an oxidation-reduction reaction of lithium ions may be carried out. In detail, as the cathode active material, at least one selected from lithium intercalation materials in which lithium is bound to at least one selected from i) $LiCoO_2$, ii) $LiCo_aMn_bNi_cO_2$ ($0.3 \le a \le 0.7$, $0.3 \le b \le 0.7$, $0.3 \le c \le 0.7$, $a+b+c=1$), iii) $LiNiO_2$, iv) $LiFePO_4$, v) $LiMn_2O_4$, vi) $LiNi_xMn_yO_4$ ($x+y=2$), and vii) $V_2O_5$, TiS, and MoS may be used.

The conductive material is not particularly limited as long as it has excellent electron conductivity, but a carbon based material may be used. More specifically, at least one selected from carbon black and Ketjen black may be used.

As the binder, at least one selected from carboxymethylcellulose, hydroxyethylcellulose, hydroxypropylcellulose, hydroxypropylmethylcellulose, polyvinylidenefluoride, polytetrafluoroethylene, polyethylene, polypropylene, polybutadiene, butyl rubber, fluoro rubber, polyethyleneoxide, polyvinylalcohol, polyacrylic acid and salts thereof, polyvinylpyrrolidone, polyepichlorohydrin, polyphosphazene, polyacrylonitrile, polystyrene, polyvinylpyridine, chlorosulfonated polyethylene, latex, a polyester resin, an acrylic resin, a phenol resin, an epoxy resin, polymers of propylene and (C2-C8) olefin, a copolymer of (meth)acrylic acid and (meth)acrylic acid alkyl ester, a copolymer of vinylidene fluoride and hexafluoropropylene, and polymethylmethacrylate may be used.

The cathode may be manufactured by mixing the cathode active material, the conductive material, the binder, and a solvent to prepare a cathode active material composition, and then applying the cathode active material composition on the cathode current collector, or laminating a film, which is obtained by casting the cathode active material composition on a separate support and delaminating the cast material, on the cathode current collector.

As the solvent, N-methylpyrrolidone, acetone, tetrahydrofuran, decane, or the like, may be used.

Each of the components of the cathode active material composition may be used in a content range generally used in a lithium rechargeable battery.

The anode may include an anode current collector and an anode active material layer formed on the anode current collector, and the anode active material layer may contain an anode active material, a conductive material, and a binder.

As the anode current collector, a copper thin film may be used, but the anode current collector is not limited thereto.

As the anode active material, a carbon material may be used, and an example of the carbon material may include natural graphite, artificial graphite, or the like.

The conductive material and the binder are as described above.

The anode may be manufactured by mixing the anode active material, the conductive material, the binder, and a solvent to prepare an anode active material composition, and then applying the anode active material composition on the anode current collector, or laminating a film, which is obtained by casting the anode active material composition on a separate support and delaminating the cast material, on the anode current collector.

The solvent is as described above.

Each of the components of the anode active material composition may be used in a content range generally used in the lithium rechargeable battery.

As the separator, any separator may be used as long as it is generally used in the lithium rechargeable battery. For example, a polyethylene separator, a polypropylene separator, a polyvinylidene fluoride separator, or a multilayer separator composed of two or more layers made of polyethylene, polypropylene, or polyvinylidene fluoride may be used.

Hereinafter, preferable examples of the present invention will be described. However, the following Examples are only preferable examples of the present invention, and the present invention is not limited thereto.

Example 1: Manufacturing of Gel Polymer Electrolyte

Example 1-1: Manufacturing of Gel Polymer Electrolyte Using Three Different Kinds of Thermally Crosslinkable Monomers A gel polymer electrolyte was manufactured by mixing three different kinds of thermally crosslinkable monomers with a dissociable salt and an organic solvent and then applying heat to the mixture according to the exemplary embodiment of the present invention.

First, as three different kinds of thermally crosslinkable monomers, trimethylolpropane-ethoxylate triacrylate, acrylic acid, and carboxyethyl acrylate were prepared.

In detail, the thermally crosslinkable monomers were mixed at a weight ratio of 40:40:20 (trimethylolpropane-ethoxylate triacrylate:acrylic acid:carboxyethyl acrylate) and prepared.

Further, as the organic solvent, a mixture in which ethylene carbonate (EC) and dimethyl carbonate (DMC) were mixed with each other at a volume ratio of 1:1 was mixed with vinylene carbonate (VC) at a weight ratio of 95:5 (mixture of EC and DMC:VC) and prepared.

In addition, as the dissociable salt, $LiPF_6$ was used, and $LiPF_6$ was prepared so that a concentration of $LiPF_6$ in the organic solvent was 1 M.

Each of the prepared materials, that is, three different kinds of thermally crosslinkable monomers, the dissociable salt, and the organic solvent were all mixed, thereby preparing a precursor composition.

Thereafter, heat (50° C.) was applied to the precursor composition for 5 hours to induce a thermal crosslinking reaction of the three different kinds of thermally crosslinkable monomers contained in the precursor composition. As a result, a gel polymer electrolyte illustrated in FIG. 1 was obtained.

Example 1-2: Manufacturing of Gel Polymer Electrolyte Using Three Different Kinds of Photo-Crosslinkable Monomers A gel polymer electrolyte was manufactured by mixing three different kinds of photo-crosslinkable monomers with a dissociable salt and an organic solvent and then applying UV light to the mixture according to the exemplary embodiment of the present invention.

First, as three different kinds of photo-crosslinkable monomers, trimethylolpropane-ethoxylate triacrylate, methyl cyanoacrylate, and hydroxyethyl methacrylate were prepared.

In detail, the photo-crosslinkable monomers were mixed at a weight ratio of 50:30:20 (trimethylolpropane-ethoxylate triacrylate:methyl cyanoacrylate:hydroxyethyl methacrylate) and prepared.

Further, as the organic solvent, a mixture of ethylene carbonate (EC) and propylene carbonate (PC) was prepared by mixing EC and PC at a volume ratio of 1:1 (EC:PC) and prepared.

In addition, as the dissociable salt, $LiPF_6$ was used, and $LiPF_6$ was prepared so that a concentration of $LiPF_6$ in the organic solvent was 1 M.

Each of the prepared materials, that is, three different kinds of photo-crosslinkable monomers, the dissociable salt, and the organic solvent were all mixed, thereby preparing a precursor composition.

Thereafter, UV light (intensity: 2000 mW $cm^{-2}$) was irradiated to the precursor composition for 5 seconds to induce a photo-crosslinking reaction of the three different kinds of photo-crosslinkable monomers contained in the precursor composition. As a result, a gel polymer electrolyte was obtained.

Comparative Example 1: Manufacturing of Gel Polymer Electrolyte Using One Kind of Thermally Crosslinkable Monomer A gel polymer electrolyte was manufactured by mixing only one kind of thermally crosslinkable monomer with a dissociable salt and an organic solvent and then applying heat to the mixture, unlike the exemplary embodiment of the present invention.

In detail, the precursor composition was prepared by the same method as in Example 1-1 except for using trimethylolpropane-ethoxylate triacrylate as one kind of thermally crosslinkable monomer.

Further, as a result of inducing a thermal crosslinking reaction of one kind of thermally crosslinkable monomer in the precursor composition using the same method as in Example 1-1, a gel polymer electrolyte was obtained.

Manufacturing Example 1: Manufacturing of Gel Polymer Electrolyte Film

A film-type gel polymer electrolyte having both surfaces on which a current collector was attached was manufactured using each of the precursor compositions prepared in Example 1 and Comparative Example 1. This is to easily evaluate adhesion with an electrode.

Manufacturing Example 1-1: Manufacturing of Gel Polymer Electrolyte Film Using Three Different Kinds of Thermally Crosslinkable Monomers After applying the precursor composition prepared in Example 1-1 on an aluminum current collector including a polyethylene terephthalate (PET) mold attached thereto at a thickness of about 150 μm, another aluminum current collector was covered thereon, thereby manufacturing a laminate.

Heat (50° C.) was applied to the laminate for 5 hours to induce a thermal crosslinking reaction of the three different kinds of thermally crosslinkable monomers contained in the laminate. As a result, a film-type gel polymer electrolyte was obtained.

Manufacturing Example 1-2: Manufacturing of Gel Polymer Electrolyte Using Three Different Kinds of Photo-Crosslinkable Monomers After applying the precursor composition prepared in Example 1-2 on an aluminum current collector including a polyethylene terephthalate (PET) mold attached thereto at a thickness of about 150 μm, another aluminum current collector was covered thereon, thereby manufacturing a laminate.

UV light (intensity: 2000 mW cm$^{-2}$) was irradiated to the laminate for 5 seconds to induce a photo-crosslinking reaction of the three different kinds of photo-crosslinkable monomers contained in the laminate. As a result, a film-type gel polymer electrolyte was obtained.

Comparative Manufacturing Example 1: Manufacturing of Gel Polymer Electrolyte Film Using One Kind of Thermally Crosslinkable Monomer After manufacturing a laminate by the same method as in Manufacturing Example 1-1 except for using the precursor composition prepared in Comparative Example 1 instead of the precursor composition prepared in Example 1, a thermal crosslinking reaction of one kind of thermally crosslinkable monomer was induced. As a result, a film-type gel polymer electrolyte was obtained.

Manufacturing Example 2: Manufacturing of Coin Cell Including Gel Polymer Electrolyte Manufacturing Example 2-1: Manufacturing of Coin Cell Using Three Different Kinds of Thermally Crosslinkable Monomers (Manufacturing of Lithium Metal Asymmetric Coin Cell)

A lithium metal asymmetric coin cell was manufactured using the precursor composition prepared in Example 1-1.

More specifically, a lithium (Li) metal was used as a counter electrode, stainless-steel was used as a working electrode, a polyethylene separator (Tonen Chemical Corp., F20BHE, thickness: 20 μm) was used as a separator, and the precursor composition prepared in Example 1-1 was injected, thereby manufacturing a coin cell using a general manufacturing method.

Heat (50° C.) was applied to the manufactured coin cell for 5 hours to induce a thermal crosslinking reaction of the precursor composition, more specifically, three different kinds of thermally crosslinkable monomers, contained in the coin cell. Finally, a lithium metal asymmetric coin cell was obtained.

(Manufacturing of Lithium Ion Rechargeable Battery)

A lithium ion rechargeable battery was manufactured in a form of a coin cell using the precursor composition prepared in Example 1-1.

More specifically, a cathode active material (LiFePO$_4$), a conductive material (Denka black), and a binder (PVDF) were uniformly mixed in an N-methyl-2-pyrrolidone solvent so as to have weight ratio of 80:10:10 (cathode active material:conductive material:binder). The mixture was uniformly applied on aluminum foil, compressed using a roll press, and dried in a vacuum oven (100° C.) for 12 hours, thereby manufacturing a cathode.

As an anode, a lithium (Li) metal was used.

The cathode, the anode, and a polyethylene separator (Tonen Chemical Corp., F20BHE, thickness: 20 μm) were used, respectively, and the precursor composition prepared in Example 1-1 was injected, thereby manufacturing a coin cell using a general manufacturing method.

Heat (50° C.) was applied to the manufactured coin cell for 5 hours to induce a thermal crosslinking reaction of the precursor composition, more specifically, three different kinds of thermally crosslinkable monomers, contained in the coin cell. Finally, a coin cell type lithium ion rechargeable battery was obtained.

Manufacturing Example 2-2: Manufacturing of Coin Cell Using Three Different Kinds of Photo-Crosslinkable Monomers (Manufacturing of Lithium Metal Asymmetric Coin Cell)

A lithium metal asymmetric coin cell was manufactured using the precursor composition prepared in Example 1-2.

More specifically, a lithium (Li) metal was used as a counter electrode, a polyethylene separator (Tonen Chemical Corp., F20BHE, thickness: 20 μm) was used as a separator, and the precursor composition prepared in Example 1-2 was injected. UV light (intensity: 2000 mW cm$^{-2}$) was irradiated to the injected precursor composition for 5 seconds to induce a photo-crosslinking reaction of the three different kinds of photo-crosslinkable monomers contained in the precursor composition. As a result, a gel polymer electrolyte was obtained, and a coin cell was manufactured by a general manufacturing method. Finally, a lithium metal asymmetric coin cell was obtained.

(Manufacturing of Lithium Ion Rechargeable Battery)

A lithium ion rechargeable battery was manufactured in a form of a coin cell using the precursor composition prepared in Example 1-2.

In detail, a cathode, an anode, and the polyethylene separator (Tonen Chemical Corp., F20BHE, thickness: 20 μm) were used, respectively, and the precursor composition prepared in Example 1-2 was injected. UV light (intensity: 2000 mW cm$^{-2}$) was irradiated to the injected precursor composition for 5 seconds to induce a photo-crosslinking reaction of the three different kinds of photo-crosslinkable monomers contained in the precursor composition. As a result, a gel polymer electrolyte was obtained, and a coin cell was manufactured by a general manufacturing method. Finally, a coin cell type lithium ion rechargeable battery was obtained.

Comparative Manufacturing Example 2:
Manufacturing of Coin Cell Using One Kind of Thermally Crosslinkable Monomer A lithium metal asymmetric coin cell and a lithium ion rechargeable battery were manufactured, respectively, by the same methods as in Manufacturing Example 2-1 except for using the precursor composition prepared in Comparative Example 1 instead of the precursor composition prepared in Example 1-1.

Experimental Example 1: Evaluation of Ion Conductivity of Gel Polymer Electrolyte In order to evaluate ion conductivity of each of the gel polymer electrolytes manufactured in Example 1 and Comparative Example 1, ion conductivity (measurement value) of each of the lithium ion rechargeable batteries in Manufacturing Example 2 and Comparative Manufacturing Example 2 was measured using a resistance analysis device, and the measured ion conductivity was corrected for a resistance value by the polyethylene separator (correction value). The results are illustrated in the following Table 1.

In detail, after using a mixture of the organic solvent and the dissociable salt as an electrolyte (a carbonate based liquid electrolyte which did not contain each of the gel polymer electrolytes in Example 1) and manufacturing a coil cell using a general manufacturing method, at the time of measuring ion conductivity of the coin cell, the measured value was 1.218×10$^{-3}$ S cm$^{-1}$. The correction value is a value obtained by correcting the measurement value using the ion conductivity of the liquid electrolyte.

TABLE 1

| Classification | Ion Conductivity (S · cm$^{-1}$) | |
| --- | --- | --- |
| | Measurement value | Correction Value |
| Manufacturing Example 2-1 (Lithium Ion Rechargeable Battery including Gel polymer Electrolyte in Example 1-1) | 9.240 × 10$^{-4}$ | 1.519 × 10$^{-2}$ |
| Manufacturing Example 2-2 (Lithium Ion Rechargeable Battery including Gel polymer Electrolyte in Example 1-2) | 9.044 × 10$^{-4}$ | 1.486 × 10$^{-2}$ |
| Comparative Manufacturing Example 2 (Lithium Ion Rechargeable Battery including Gel polymer Electrolyte in Comparative Example 1) | 8.685 × 10$^{-4}$ | 1.427 × 10$^{-2}$ |

Since the correction value illustrated in Table 1 is a value obtained by correcting the measurement value for the resistance of the polyethylene separator, the correction value corresponds only to ion conductivity exhibited by each of the gel polymer electrolytes in Example 1 and Comparative Example 1. In detail, the ion conductivity correction value as described above is exhibited by ion conductive materials in each of the gel polymer electrolytes.

In more detail, each of the gel polymer electrolytes in Comparative Example 1 and Examples 1-1 and 1-2 commonly contains ion conductive materials (that is, the organic solvent and salts dissociated in the organic solvent) in a polymer matrix, which is non-ion conductive.

Therefore, regardless of the polymer matrix, in all of the batteries in Comparative Manufacturing Example 2 and Manufacturing Examples 2-1 and 2-2, high ion conductivity may be exhibited due to the ion conductive materials.

Actually, referring to the correction values illustrated in Table 1, the batteries in Comparative Manufacturing Example 2-2 and Manufacturing Examples 2-1 and 2-2 had relatively high ion conductivities of 1.427×10$^{-2}$ S·cm$^{-1}$, 1.519×10$^{-2}$ S·cm$^{-1}$, and 1.486×10$^{-2}$ S·cm$^{-1}$, respectively.

Experimental Example 2: Evaluation of Adhesion of Gel Polymer Electrolyte with Electrode Adhesion of the gel polymer electrolytes manufactured in Example 1 and Comparative Example 1 with the electrode was evaluated using the gel polymer electrolytes manufactured in a film form in Manufacturing Example 1 and Comparative Manufacturing Example 1, respectively.

Figure 2:
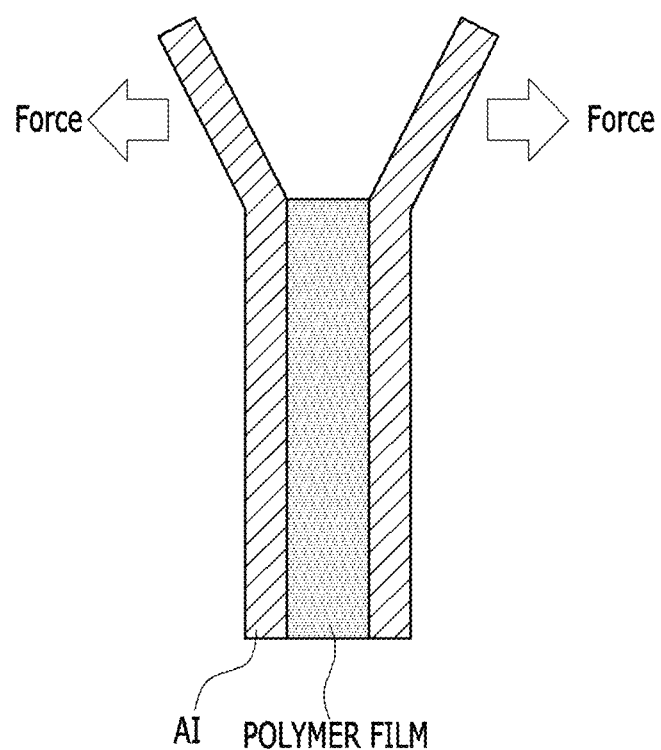
FIG. 2 is a view schematically illustrating a method of evaluating adhesion of a gel polymer electrolyte film according to an exemplary embodiment of the present invention.

More specifically, as illustrated in FIG. 2, adhesion of each of the gel polymer electrolytes with the electrode was evaluated by applying force to the aluminum current collector attached to both surfaces of each of the gel polymer electrolyte films at a speed of 50 mm min$^{-1}$ in an outward direction.

Figure 3:
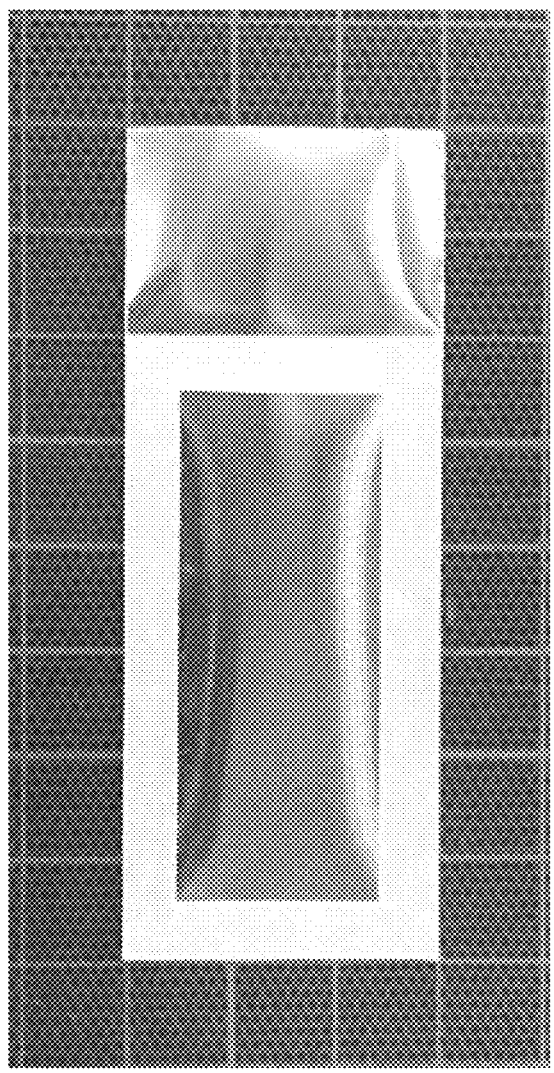
FIG. 3 is a photograph illustrating an exterior of the gel polymer electrolyte film after evaluating the adhesion.

FIG. 3 is a photograph of a sample including the gel polymer electrolyte film in Manufacturing Example 1-1 after evaluating the adhesion. Further, the results obtained by evaluating adhesion were illustrated in FIG. 4 (the gel polymer electrolyte film in Manufacturing Example 1-1, manufactured using a gel polymer electrolyte composition in Example 1-1), FIG. 5 (the gel polymer electrolyte film in Manufacturing Example 1-2, manufactured using a gel polymer electrolyte composition in Example 1-2), and FIG. 6 (the gel polymer electrolyte film in Comparative Manufacturing Example 1, manufactured using a gel polymer composition in Comparative Example 1), respectively.

Figure 4:
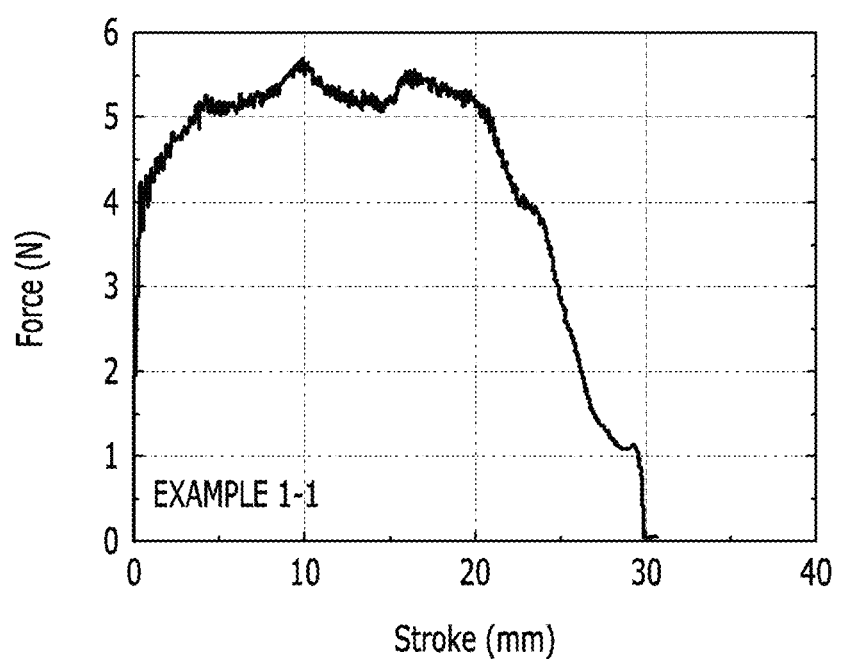
FIG. 4 is a graph illustrating results obtained by evaluating adhesion of a gel polymer electrolyte in Example 1-1 of the present invention.
Figure 5:
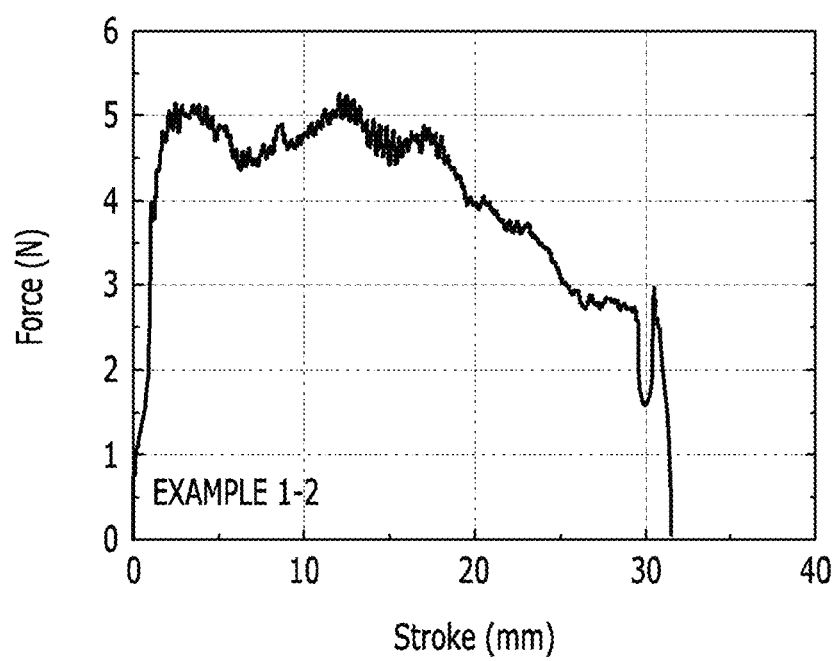
FIG. 5 is a graph illustrating results obtained by evaluating adhesion of a gel polymer electrolyte in Example 1-2 of the present invention.
Figure 6:
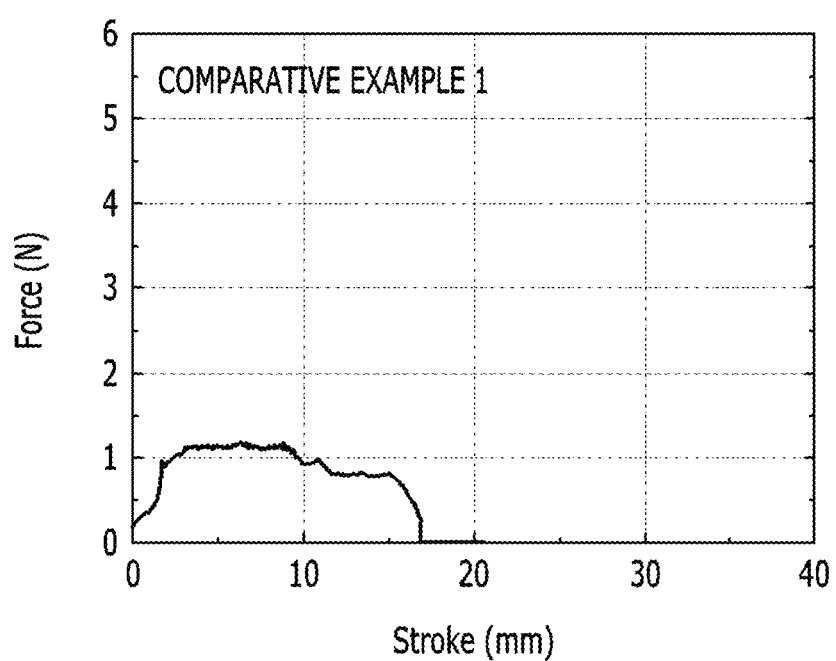
FIG. 6 is a graph illustrating results obtained by evaluating adhesion of a gel polymer electrolyte in Comparative Example 1 of the present invention.

Referring to graphs in FIGS. 4 to 6, it may be appreciated that each of the gel polymer electrolyte films in Manufacturing Examples 1-1 and 1-2 had more excellent adhesion with the aluminum current collector as compared to Comparative Manufacturing Example 1.

More specifically, it may be evaluated that each of the gel polymer electrolyte films in Manufacturing Examples 1-1 and 1-2 commonly includes a multi-component polymer matrix in which three kinds of crosslinkable monomers are thermally crosslinked (Example 1-1) or photo-crosslinked (Example 1-2), and since this multi-component polymer matrix is crosslinked by two or more functional groups of a carboxyl group, an acrylate group, and a cyano group, excellent adhesion with the electrode may be exhibited as described above.

Meanwhile, in consideration that in Comparative Manufacturing Example 1, the gel polymer electrolyte film was manufactured by the same thermal crosslinking method as in Manufacturing Example 1-1, it may be appreciated that since the polymer matrix included in the gel polymer electrolyte was made of a single component, adhesion of the gel polymer electrolyte film in Comparative Manufacturing Example 1 with the aluminum current collector was low.

More specifically, the gel polymer electrolyte film in Comparative Manufacturing Example 1 included a single-component polymer matrix in which only one kind of crosslinkable monomer was thermally crosslinked (Comparative Example 1), and it may be evaluated that since this single-component polymer matrix was crosslinked only by the acrylate group, relatively low adhesion with the electrode was exhibited.

Referring to this result, it may be evaluated that in the case in which three different kinds of crosslinkable monomers are used according to the exemplary embodiment of the present invention and these crosslinkable monomers include at least two functional groups of the carboxylic group, the acrylate group, and the cyano group, in all film-type gel polymer electrolytes manufactured by thermally crosslinking or photo-crosslinking these crosslinkable monomers, interfacial adhesion with a current collector is excellent.

Experimental Example 3: Evaluation of Electrochemical Stability of Battery Including Gel Polymer Electrolyte Oxidation stability and oxidation-reduction stability of each of the lithium metal asymmetric coin cells manufactured in Manufacturing Example 2 and Comparative Manufacturing Example 2 were evaluated.

More specifically, in order to evaluate oxidation stability, linear sweep voltammetry was used. Here, a constant current (1.0 mVs$^{-1}$) was applied, and a measurement voltage was fixed in a range of 3.0 to 7.0 V. The results obtained by evaluating oxidation stability as described above were illustrated as graphs in FIG. 7 (the asymmetric coin cell in Manufacturing Example 2-1, including the gel polymer electrolyte in Example 1-1), FIG. 8 (the asymmetric coin cell in Manufacturing Example 2-2, including the gel polymer electrolyte in Example 1-2) and FIG. 9 (the asymmetric coin cell in Comparative Manufacturing Example 2, including the gel polymer electrolyte in Comparative Example 1), respectively.

Figure 7:
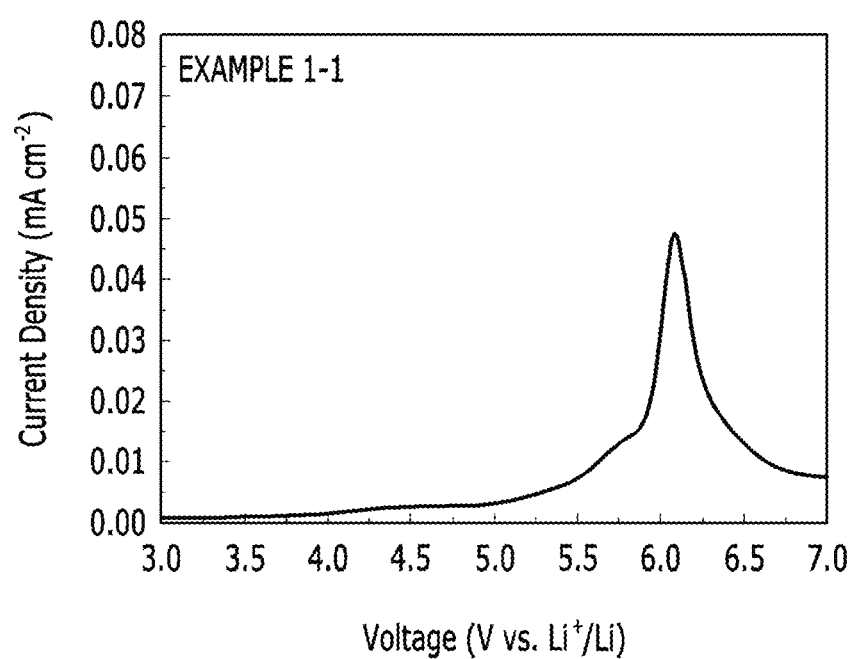
FIG. 7 is a graph illustrating results obtained by evaluating oxidation stability of a lithium metal asymmetric coin cell according to Example 1-1 of the present invention.
Figure 8:
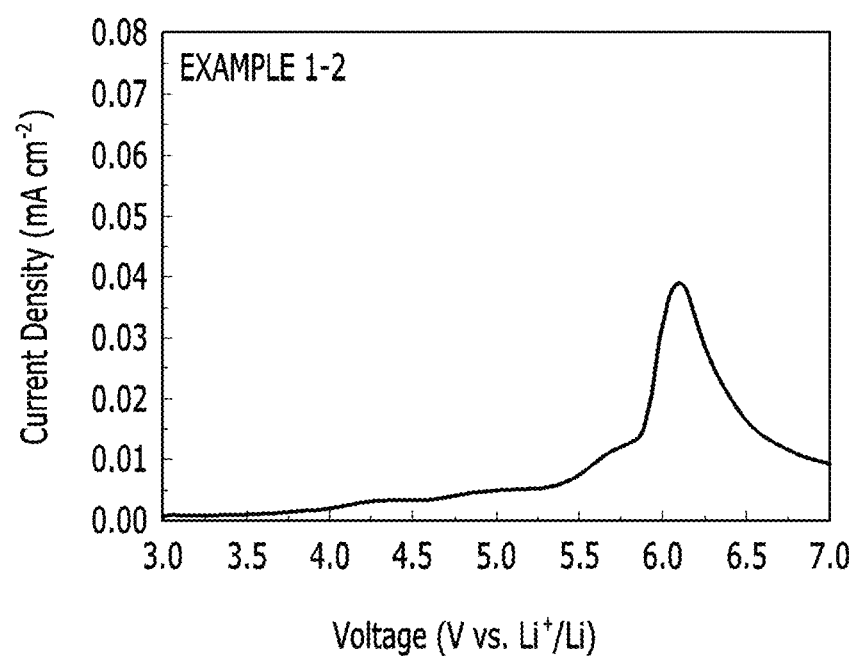
FIG. 8 is a graph illustrating results obtained by evaluating oxidation stability of a lithium metal asymmetric coin cell according to Example 1-2 of the present invention.
Figure 9:
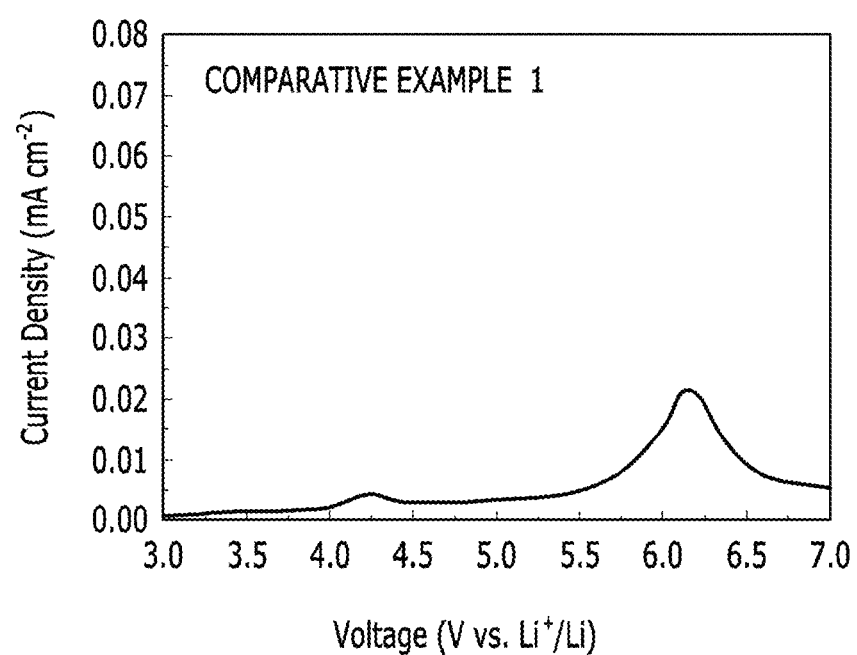
FIG. 9 is a graph illustrating results obtained by evaluating oxidation stability of a lithium metal asymmetric coin cell according to Comparative Example 1 of the present invention.

It may be confirmed that in the measurement voltage ranges of the graphs in FIGS. 7 to 9, oxidation stability of the gel polymer electrolyte included in each of the asymmetric coin cells in Manufacturing Examples 2-1 and 2-2 was more excellent as compared to Comparative Manufacturing Example 2.

Further, in order to evaluate oxidation-reduction stability, cyclic voltammetry was used. Here, a constant current (1.0 mVs$^{-1}$) was applied, a measurement voltage was fixed in a range of 0.0 to 5.0 V (vs. Li/Li$^+$), and three charge and discharge cycles were performed. The results obtained by evaluating oxidation-reduction stability as described above were illustrated as graphs in FIG. 10 (the asymmetric coin cell in Manufacturing Example 2-1, including the gel polymer electrolyte in Example 1-1), FIG. 11 (the asymmetric coin cell in Manufacturing Example 2-2, including the gel polymer electrolyte in Example 1-2) and FIG. 12 (the asymmetric coin cell in Comparative Manufacturing Example 2, including the gel polymer electrolyte in Comparative Example 1), respectively.

Figure 10:
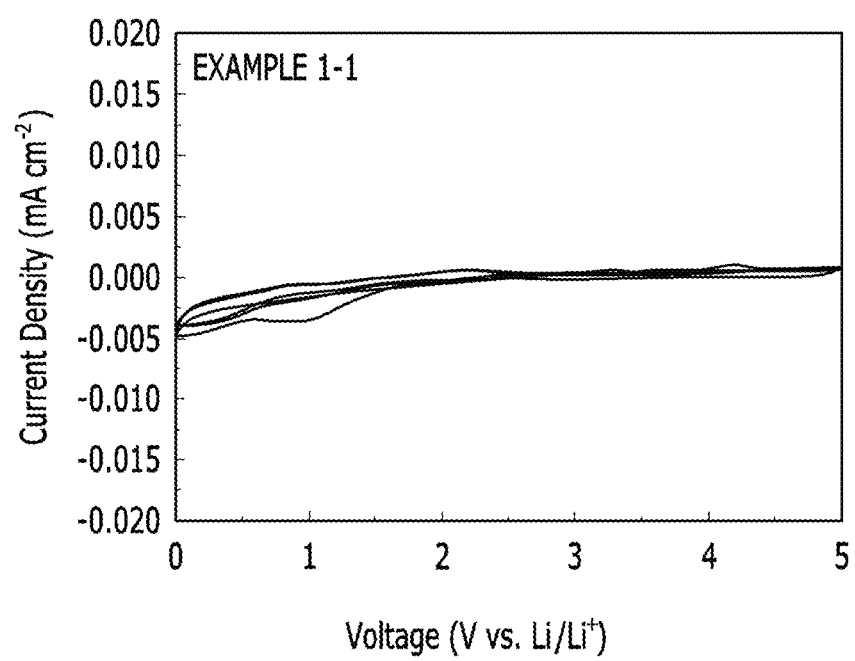
FIG. 10 is a graph illustrating results obtained by evaluating oxidation-reduction stability of the lithium metal asymmetric coin cell according to Example 1-1 of the present invention.
Figure 11:
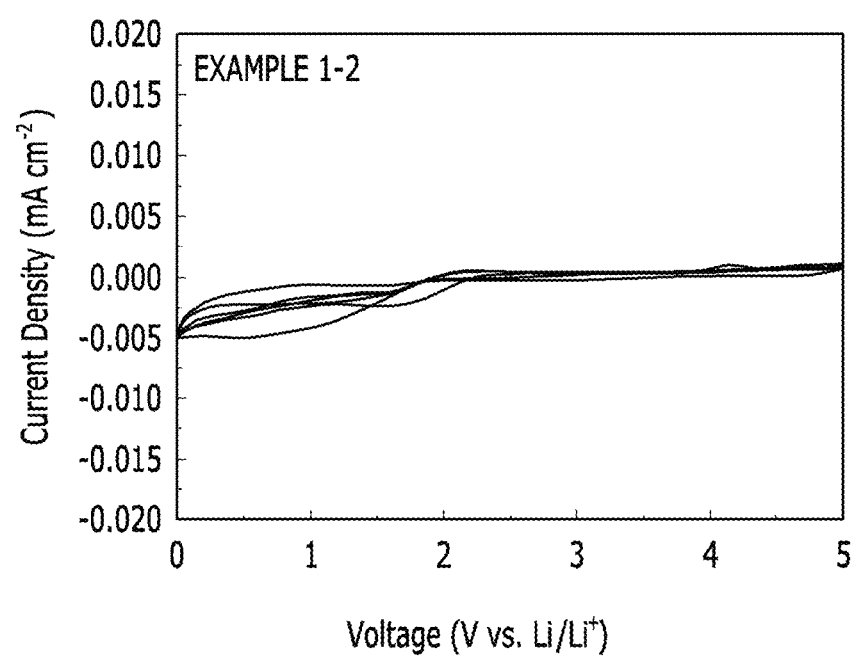
FIG. 11 is a graph illustrating results obtained by evaluating oxidation-reduction stability of the lithium metal asymmetric coin cell according to Example 1-2 of the present invention.
Figure 12:
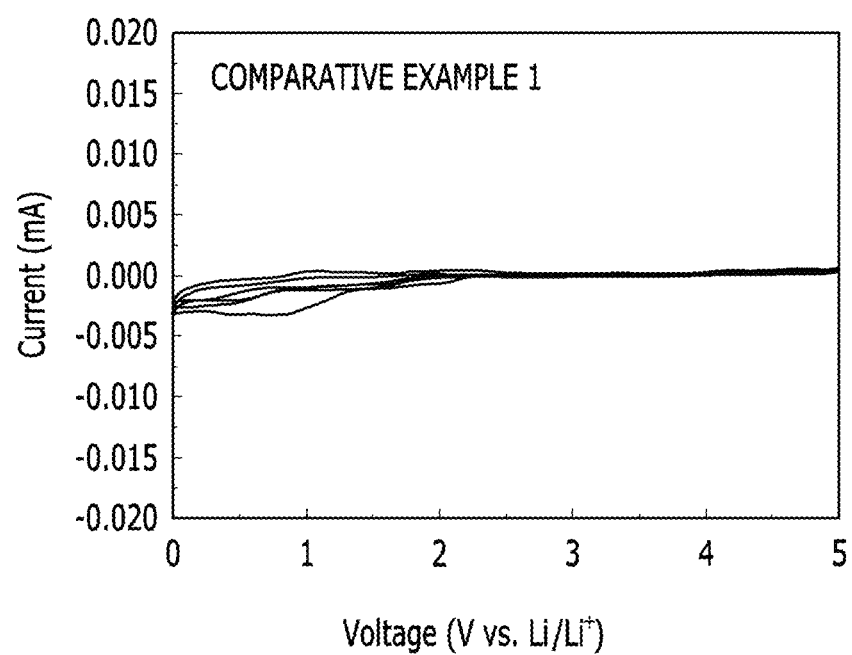
FIG. 12 is a graph illustrating results obtained by evaluating oxidation-reduction stability of the lithium metal asymmetric coin cell according to Comparative Example 1 of the present invention.

It may be confirmed that in the measurement voltage ranges of the graphs in FIGS. 10 to 12, even though repetitive oxidation and reduction occurred, stability of the gel polymer electrolyte included in each of the asymmetric coin cells in Manufacturing Examples 2-1 and 2-2 was maintained as compared to Comparative Manufacturing Example 2.

Referring to this result, it may be evaluated that in the case of using the gel polymer electrolyte manufactured by thermally crosslinking (Example 1-1) or photo-crosslinking (Example 1-2) three different kinds of crosslinkable monomers according to the exemplary embodiment of the present invention in a battery, each of the gel polymer electrolytes is not decomposed but is stably maintained in spite of repetitive oxidation and reduction.

Experimental Example 4: Evaluation of Discharge Capacity of Battery Including Gel Polymer Electrolyte Discharge capacity of each of the lithium ion rechargeable batteries manufactured in Manufacturing Example 2 and Comparative Manufacturing Example 2 was evaluated.

In detail, 50 charge and discharge cycles were performed at a charge and discharge current rate of 0.1 C. The results obtained by evaluating discharge capacity as described above were illustrated as graphs in FIG. 13 (the lithium ion rechargeable battery in Manufacturing Example 2-1, including the gel polymer electrolyte in Example 1-1), FIG. 14 (the lithium ion rechargeable battery in Manufacturing Example 2-2, including the gel polymer electrolyte in Example 1-2) and FIG. 15 (the lithium ion rechargeable battery in Comparative Manufacturing Example 2, including the gel polymer electrolyte in Comparative Example 1), respectively.

Figure 13:
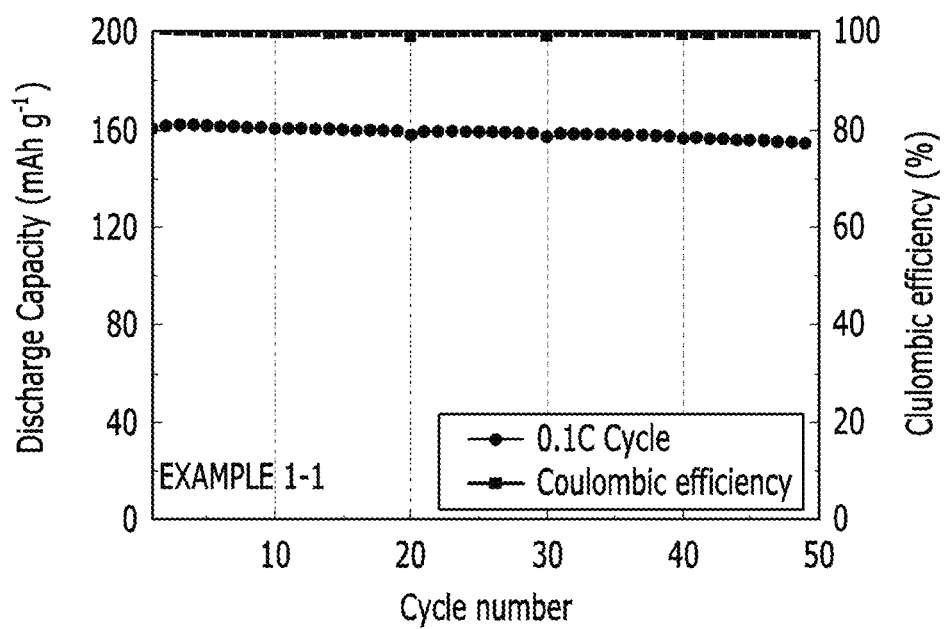
FIG. 13 is a graph illustrating results obtained by evaluating discharge capacity of the lithium ion rechargeable battery according to Example 1-1 of the present invention.
Figure 14:
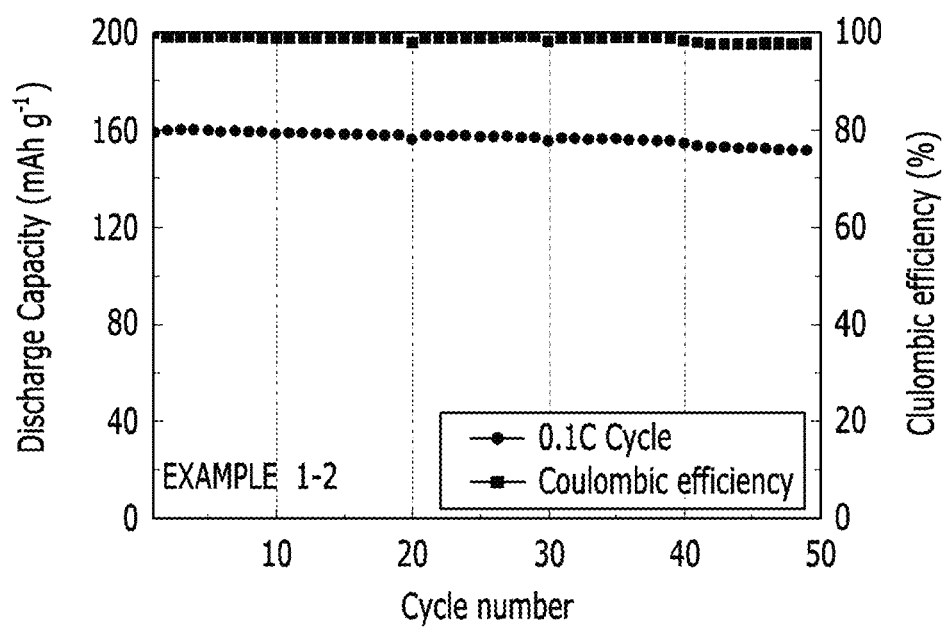
FIG. 14 is a graph illustrating results obtained by evaluating discharge capacity of the lithium ion rechargeable battery according to Example 1-2 of the present invention.
Figure 15:
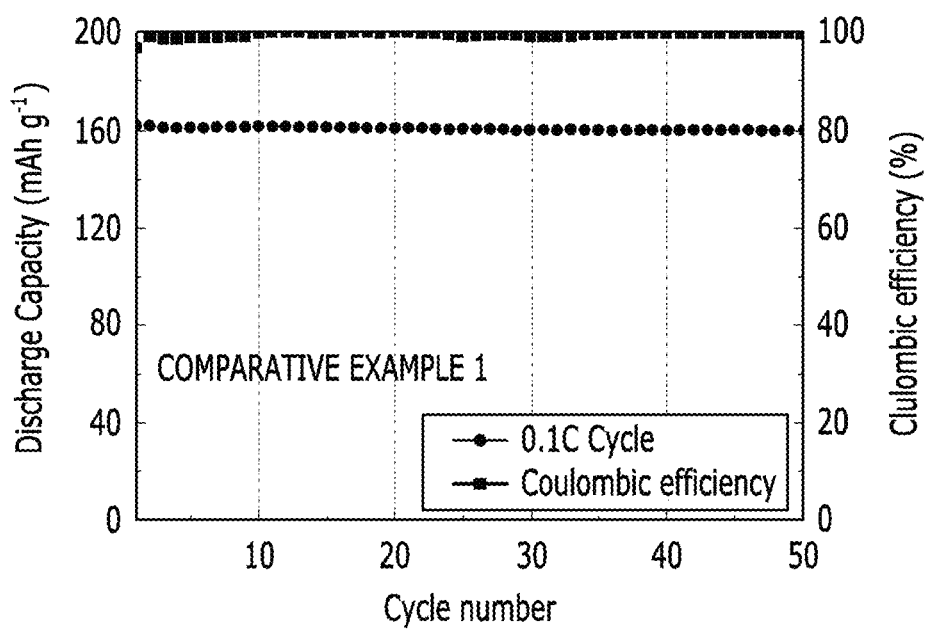
FIG. 15 is a graph illustrating results obtained by evaluating discharge capacity of the lithium ion rechargeable battery according to Comparative Example 1 of the present invention.

Discharge capacity and coulombic efficiency of the lithium ion rechargeable batteries described above are illustrated in the graphs in FIGS. 13 to 15, respectively. Referring to FIGS. 13 and 14, in the lithium ion rechargeable batteries in Manufacturing Examples 2-1 and 2-2, commonly, initial discharge capacity was measured to be 160 mAhg$^{-1}$, and discharge capacity after 50 cycles was measured to be 155 mAhg$^{-1}$. Therefore, it may be confirmed that even after 50 cycles, coulombic efficiency of almost 100% or so was maintained.

Meanwhile, the lithium ion rechargeable battery in Comparative Manufacturing Example 2 included the gel polymer electrolyte manufactured by the same thermal crosslinking method as in Manufacturing Example 2-1, and discharge capacity had a similar tendency to that in Manufacturing Example 2-1, but coulombic efficiency after 50 cycles was lower than that in Manufacturing Example 2-1.

Referring to this result, it may be evaluated that in the case of using the gel polymer electrolyte manufactured by thermally crosslinking (Example 1-1) or photo-crosslinking (Example 1-2) three different kinds of crosslinkable monomers according to the exemplary embodiment of the present invention in a battery, excellent cycle characteristics are exhibited due to each of the gel polymer electrolytes.

The present invention is not limited to the exemplary embodiments disclosed herein but will be implemented in various forms, and those skilled in the art will appreciate that various modifications and alterations may be made without departing from the spirit or essential feature of the present invention. Therefore, it should be understood that the above-mentioned embodiments are not restrictive but are exemplary in all aspects.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A gel polymer electrolyte comprising:
a multi-component crosslinked polymer matrix;
a dissociable salt; and
an organic solvent,
wherein a content of the multi-component crosslinked polymer matrix is 1 to 50 wt %, and
the multi-component crosslinked polymer matrix has a net structure formed by crosslinking at least three different kinds of crosslinkable monomers,
wherein each of the crosslinkable monomers includes any functional group selected from the group consisting of a carboxylic group, an acrylate group, and a cyano group; and the multi-component crosslinked polymer matrix includes the acrylate group, together with the carboxylic group.

2. The gel polymer electrolyte of claim 1, wherein: each of the crosslinkable monomers is any one selected from the group consisting of a thermally crosslinkable monomer, a derivative of the thermally crosslinkable monomer, a photo-crosslinkable monomer, a derivative of the photo-crosslinkable monomer, and a combination thereof.

3. The gel polymer electrolyte of claim 2, wherein: each of the crosslinkable monomers is any one selected from the group consisting of trimethylolpropane-ethoxylate triacrylate, acrylic acid, carboxyethyl acrylate, poly acrylic acid, carboxymethyl cellulose, alginate, polyvinyl alcohol, agarose, polyethylene glycol diacrylate, triethylene glycol diacrylate, bisphenol-A-ethoxylate dimethacrylate, carboxyethyl acrylate, methyl cyanoacrylate, ethyl cyanoacrylate, ethyl cyano ethoxyacrylate, cyano acrylic acid, hydroxyethyl methacrylate, hydroxypropyl acrylate, derivatives thereof, and mixtures thereof.

4. The gel polymer electrolyte of claim 1, wherein: the dissociable salt includes $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$, LiCl, LiI, $LiB(C_2O_4)_2$, or a combination thereof; wherein x and y are natural numbers.

5. The gel polymer electrolyte of claim 1, wherein: a concentration of the dissociable salt in the organic solvent is 0.1 to 5.0 M.

6. The gel polymer electrolyte of claim 1, wherein: the organic solvent includes a carbonate based solvent, an ester based solvent, an ether based solvent, a ketone based solvent, an alcohol based solvent, an aprotic solvent, a nitrile based solvent, a glyme based solvent, or a combination thereof.

7. The gel polymer electrolyte of claim 1, wherein the dissociable salt includes a lithium salt.

8. The gel polymer electrolyte of claim 7, wherein the lithium salt is dissociated in the organic solvent.

9. The gel polymer electrolyte of claim 3, wherein the dissociable salt includes a lithium salt, and the lithium salt is dissociated in the organic solvent.

10. The gel polymer electrolyte of claim 9, wherein: a concentration of the dissociable salt in the organic solvent is 0.1 to 5.0 M.

11. The gel polymer electrolyte of claim 10, wherein: the organic solvent includes a carbonate based solvent, an ester based solvent, an ether based solvent, a ketone based solvent, an alcohol based solvent, an aprotic solvent, a nitrile based solvent, a glyme based solvent, or a combination thereof.

12. The gel polymer electrolyte of claim 11, wherein: the dissociable salt includes $LiPF_6$, $LiBF_4$, $LiSbF_6$, $LiAsF_6$, $LiC_4F_9SO_3$, $LiClO_4$, $LiAlO_2$, $LiAlCl_4$, LiCl, LiI, $LiB(C_2O_4)_2$, or a combination thereof.

13. An electrochemical device comprising:
a cathode;
an anode;
a separator; and
an electrolyte impregnated into the cathode, the anode, and the separator,
wherein the electrolyte is the gel polymer electrolyte of claim 1.

14. The electrochemical device of claim 13, wherein:
the electrochemical device
is a lithium rechargeable battery or a super capacitor.

15. A method of manufacturing a gel polymer electrolyte of claim 1, the method comprising:
mixing at least three different kinds of crosslinkable monomers, a dissociable salt, and an organic solvent to prepare a precursor composition; and
applying heat or ultraviolet (UV) light to the precursor composition to crosslink at least three different kinds of crosslinkable monomers,
wherein when the at least three different kinds of crosslinkable monomers are crosslinked, a multi-component crosslinked polymer matrix having a net structure is formed.

16. The method of claim 15, wherein: each of the crosslinkable monomers is any one selected from the group consisting of trimethylolpropane-ethoxylate triacrylate, acrylic acid, carboxyethyl acrylate, poly acrylic acid, carboxymethyl cellulose, alginate, polyvinyl alcohol, agarose, polyethylene glycol diacrylate, triethylene glycol diacrylate, bisphenol-A-ethoxylate dimethacrylate, carboxyethyl acrylate, methyl cyanoacrylate, ethyl cyanoacrylate, ethyl cyano ethoxyacrylate, cyano acrylic acid, hydroxyethyl methacrylate, hydroxypropyl acrylate, derivatives thereof, and mixtures thereof.

17. The method of claim 15, wherein: in the mixing of the at least three different kinds of crosslinkable monomers, the dissociable salt, and the organic solvent to prepare the precursor composition,
a total content of the crosslinkable monomers in the prepared precursor composition
is 1 to 50 wt %.

18. The method of claim 15, wherein: in the mixing of the at least three different kinds of crosslinkable monomers, the dissociable salt, and the organic solvent to prepare the precursor composition,
a concentration of the dissociable salt in the organic solvent
is 0.1 to 5.0 M.

19. A gel polymer electrolyte comprising:
a multi-component crosslinked polymer matrix;
a dissociable salt; and
an organic solvent,
wherein a content of the multi-component crosslinked polymer matrix is 1 to 50 wt %, and
the multi-component crosslinked polymer matrix has a net structure formed by crosslinking at least three different kinds of crosslinkable monomers including a first monomer, a second monomer, and a third monomer,
wherein each of the crosslinkable monomers includes any functional group selected from the group consisting of a carboxylic group, an acrylate group, and a cyano group; and the multi-component crosslinked polymer matrix includes the acrylate group, together with the carboxlic group or the cyano group;

wherein the first monomer includes two or more functional groups which are each an acrylate group, and the second and third monomers are different from the first monomer in that they include a functional group different from an acrylate.

20. A gel polymer electrolyte comprising:

a multi-component crosslinked polymer matrix;

a dissociable salt; and an organic solvent, wherein a content of the multi-component crosslinked polymer matrix is 1 to 50 wt %, and the multi-component crosslinked polymer matrix has a net structure formed by crosslinking at least three different kinds of crosslinkable monomers including a first monomer, a second monomer, and a third monomer, wherein each of the crosslinkable monomers includes any functional group selected from the group consisting of a carboxylic group, an acrylate group, and a cyano group; and the multi-component crosslinked polymer matrix includes the acrylate group, together with the carboxlic group or the cyano group;

wherein the first monomer includes two or more functional groups which are each an acrylate group, and the second and third monomers include a functional a single acrylate group.

\* \* \* \* \*